(12) United States Patent
Maezawa et al.

(10) Patent No.: US 12,142,250 B2
(45) Date of Patent: Nov. 12, 2024

(54) IMAGE CONTROL SYSTEM AND METHOD FOR CONTROLLING IMAGE

(71) Applicants: YAMAHA CORPORATION, Hamamatsu (JP); Tokyo University of the Arts, Tokyo (JP)

(72) Inventors: Akira Maezawa, Hamamatsu (JP); Motoichi Tamura, Hamamatsu (JP); Takuya Fujishima, Hamamatsu (JP); Takashi Kiriyama, Tokyo (JP); Noriko Koshida, Tokyo (JP); Toshiyuki Kuwabara, Tokyo (JP); Teruyo Uehira, Tokyo (JP); Ryoya Usuha, Tokyo (JP)

(73) Assignees: YAMAHA CORPORATION, Hamamatsu (JP); TOKYO UNIVERSITY OF THE ARTS, Tokyo (JP)

( * ) Notice: Subject to any disclaimer, the term of this patent is extended or adjusted under 35 U.S.C. 154(b) by 681 days.

(21) Appl. No.: 17/367,925

(22) Filed: Jul. 6, 2021

(65) Prior Publication Data
US 2021/0335331 A1 Oct. 28, 2021

Related U.S. Application Data

(63) Continuation of application No. PCT/JP2019/051566, filed on Dec. 27, 2019.

(30) Foreign Application Priority Data

Jan. 7, 2019 (JP) .................................. 2019-000686

(51) Int. Cl.
*G10H 1/00* (2006.01)
*G06N 20/00* (2019.01)

(52) U.S. Cl.
CPC ........... *G10H 1/0008* (2013.01); *G06N 20/00* (2019.01); *G10H 2210/056* (2013.01)

(58) Field of Classification Search
CPC . G10H 1/0008; G10H 2210/056; G06N 20/00
(Continued)

(56) References Cited

U.S. PATENT DOCUMENTS

| | | | |
|---|---|---|---|
| 8,378,199 B2 * | 2/2013 | Uehara | H04N 5/9203 84/645 |
| 8,629,342 B2 * | 1/2014 | Lee | G10H 3/186 84/610 |

(Continued)

FOREIGN PATENT DOCUMENTS

| | | | | |
|---|---|---|---|---|
| CN | 107464572 A | * | 12/2017 | G10L 21/10 |
| CN | 108806657 A | * | 11/2018 | G10H 7/00 |

(Continued)

OTHER PUBLICATIONS

Office Action issued in Chinese Appln. No. 201980087885.4 mailed Jun. 29, 2023. English machine translation provided.

(Continued)

*Primary Examiner* — Christina M Schreiber
(74) *Attorney, Agent, or Firm* — ROSSI, KIMMS & McDOWELL LLP

(57) ABSTRACT

An image control system includes an estimation circuit, an obtaining circuit, and an image control circuit, which circuits can be at least one processor. The estimation circuit receives an output from a trained model in response to an input of an acoustic signal indicating a performance of a musical piece. The estimation circuit estimates musical performance information based on the output. The musical performance information is associated with the performance indicated by the acoustic signal relative to the musical piece. The obtaining circuit obtains manipulation information that (Continued)

is associated with a playback of an image. The image control circuit controls the playback of the image based on the musical performance information. The image control circuit controls the playback of the image based on the manipulation information upon obtaining the manipulation information.

21 Claims, 8 Drawing Sheets

(58) Field of Classification Search
USPC .......................................................... 84/634
See application file for complete search history.

(56) References Cited

U.S. PATENT DOCUMENTS

| | | | | |
|---|---|---|---|---|
| 10,580,393 | B2 * | 3/2020 | Maezawa | G10H 1/361 |
| 11,967,302 | B2 * | 4/2024 | Maezawa | G06N 3/047 |
| 2002/0168176 | A1 * | 11/2002 | Iizuka | G06F 16/489 386/248 |
| 2008/0190271 | A1 * | 8/2008 | Taub | G10H 1/0058 84/645 |
| 2010/0126332 | A1 * | 5/2010 | Kobayashi | G10H 1/383 84/613 |
| 2010/0186576 | A1 * | 7/2010 | Kobayashi | G10H 1/40 84/612 |
| 2016/0189561 | A1 * | 6/2016 | Humphrey | G09B 15/00 84/609 |
| 2017/0337910 | A1 * | 11/2017 | Maezawa | G10H 1/361 |
| 2019/0237055 | A1 * | 8/2019 | Maezawa | G10H 1/36 |
| 2021/0185363 | A1 * | 6/2021 | Paiement | H04L 67/131 |
| 2021/0335331 | A1 * | 10/2021 | Maezawa | G06N 20/10 |
| 2022/0036866 | A1 * | 2/2022 | Isozaki | G10G 1/00 |
| 2022/0215822 | A1 * | 7/2022 | Mizuno | G10L 21/0272 |

FOREIGN PATENT DOCUMENTS

| | | | | | |
|---|---|---|---|---|---|
| JP | 2004233698 | A | * | 8/2004 | |
| JP | 2008097021 | A | * | 4/2008 | ............. G06F 16/40 |
| JP | 2010122630 | A | * | 6/2010 | ............. G10H 1/383 |
| JP | 2010141461 | A | * | 6/2010 | |
| JP | 2010521021 | A | * | 6/2010 | |
| JP | 2013171070 | A | | 9/2013 | |
| JP | 2015079183 | A | * | 4/2015 | |
| JP | 2017044765 | A | * | 3/2017 | |
| JP | 2020109918 | A | * | 7/2020 | ........... G10H 1/0008 |

OTHER PUBLICATIONS

International Search Report issued in Intl. Appln. No. PCT/JP2019/051566 mailed Mar. 24, 2020. English translation provided.
Written Opinion issued in Intl. Appln. No. PCT/JP2019/051566 mailed Mar. 24, 2020.
Office Action issued in Chinese Appln. No. 201980087885.4, mailed Dec. 21, 2023. English machine translation provided.
English translation of Written Opinion issued in Intl. Appln. No. PCT/JP2019/051566 mailed Mar. 24, 2020, previously cited in IDS filed Jul. 6, 2021.

* cited by examiner

FIG. 4

| Item | Seconds | Marker information RGB | Playback | Stop | Jump-cut | Loop | AI application |
|---|---|---|---|---|---|---|---|
| 1 | 0 | ... | ON | OFF | OFF | OFF | OFF |
| 2 | 1 | ... | ... | ... | ... | ... | ... |
| 3 | 630.8 | ... | OFF | OFF | OFF | OFF | ON |
| 4 | 1274.5 | ... | ... | ... | ... | ... | ... |
| 5 | 1281.72 | ... | ... | ... | ... | ... | ... |
| 6 | 1283.9 | ... | ... | ... | ... | ... | ... |
| 7 | 1284 | ... | ... | ... | ... | ... | ... |
| 8 | 1921.4 | ... | ... | | ... | ... | ... |
| 9 | 2450 | ... | ... | | ... | ... | ... |

304

IMAGE CONTROL SYSTEM AND METHOD FOR CONTROLLING IMAGE

CROSS-REFERENCE TO RELATED APPLICATIONS

The present application is a continuation application of International Application No. PCT/JP2019/051566, filed Dec. 27, 2019, which claims priority to Japanese Patent Application No. 2019-000686, filed Jan. 7, 2019. The contents of these applications are incorporated herein by reference in their entirety.

BACKGROUND

Technical Field

The embodiments disclosed herein relate to an image control system and a method of controlling an image.

Background Art

To create an effective visual effect in places such as musical venues, conventional practices have been to project a series of images in tune with music. For example, JP2010-141461A discloses a technique that enables a user to intuitively perform an editing such ordering images that are to be played back.

In an event such as a concert, however, it is necessary to control images in tune or sync with a live performance where a performer seldom plays a musical piece as exactly as the musical score dictates, often playing at a slower or faster tempo. Controlling images in tune with such live performances requires special training and/or a special skill. Thus, it has been difficult for an unskillful user to control images in tune with a live performance.

The present development has been made in view of the above-described circumstances. An example object of the present disclosure is to provide an image control system that enables even a user without a special skill to control images in tune with a musical piece.

SUMMARY

One aspect is an image control system that includes an estimation circuit, an obtaining circuit, and an image control circuit. The estimation circuit is configured to obtain an output from a trained model in response to an input of an acoustic signal indicating a performance of a musical piece. The estimation circuit is configured to estimate musical performance information based on the output. The musical performance information is associated with the performance indicated by the acoustic signal relative to the musical piece. The obtaining circuit is configured to obtain manipulation information indicating manipulation input by a user and that is associated with a playback of an image. The image control circuit is configured to control the playback of the image based on the estimated musical performance information. The image control circuit is configured to control the playback of the image based on the manipulation information upon obtaining of the manipulation information by the obtaining circuit.

Another aspect is a method of controlling an image. The method includes receiving an output from a trained model in response to an input of an acoustic signal indicating a performance of a musical piece. Musical performance information is estimated based on the output. The musical performance information is associated with the performance indicated by the acoustic signal relative to the musical piece. A playback of the image is controlled based on the estimated musical performance information. Manipulation information indicating manipulation input by a user and that is associated with the playback of the image is obtained. The playback of the image is controlled based on the manipulation information upon obtaining the manipulation information.

The above-described aspects of the present disclosure enable even a user without any special skill to control images in tune with a musical piece.

BRIEF DESCRIPTION OF THE DRAWINGS

A more complete appreciation of the present disclosure and many of the attendant advantages thereof will be readily obtained as the same becomes better understood by reference to the following detailed description when considered in connection with the following figures.

FIG. 4 illustrates an example of information stored in an image meta-information storage 304 according to the first embodiment.

DESCRIPTION OF THE EMBODIMENTS

The present development is applicable to an image control system and a method of controlling an image.

The first embodiment of the present disclosure will be described below by referring to the accompanying drawings.

Figure 1:
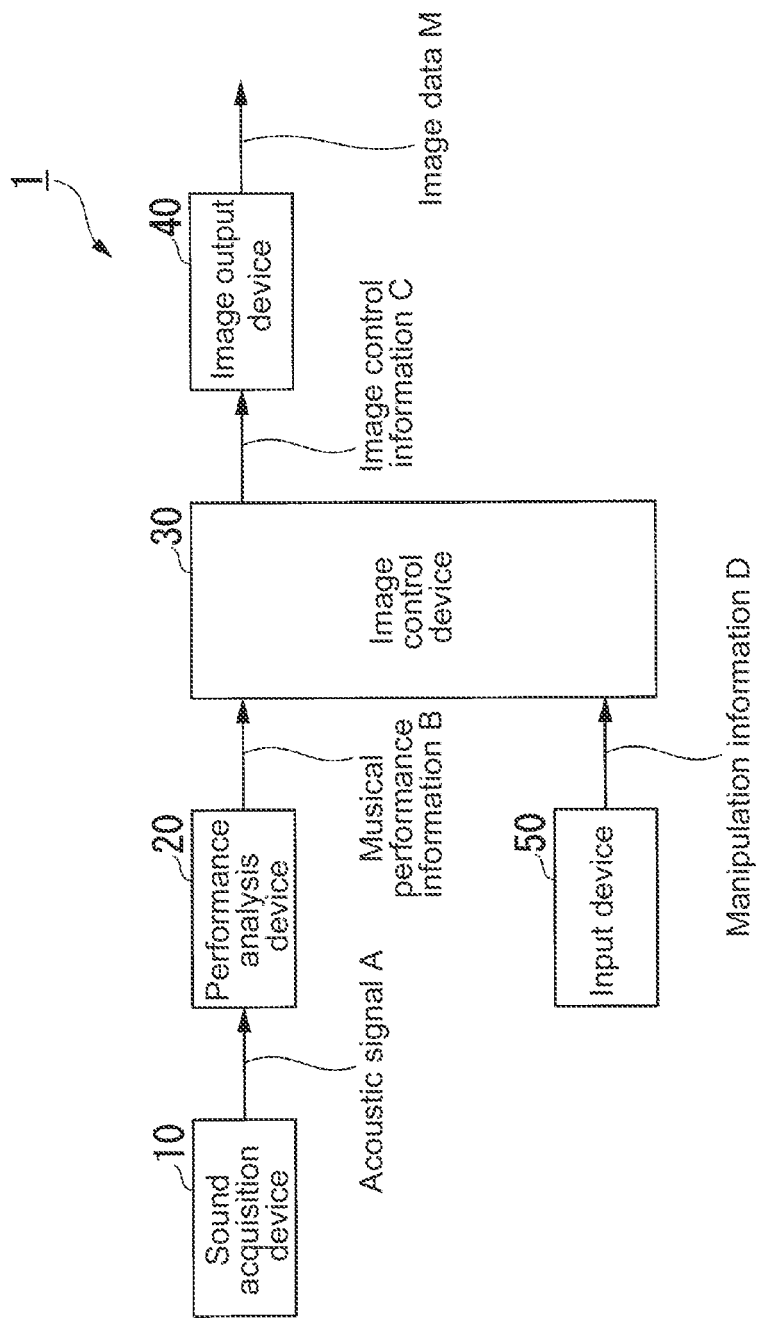
FIG. 1 is a block diagram illustrating an example configuration of an image control system 1 according to a first embodiment.

FIG. 1 is a block diagram illustrating an example configuration of the image control system 1 according to the first embodiment. The image control system 1 can include a sound acquisition device 10, the performance analysis device 20, the image control device 30, an image output device 40, and an input device 50.

The sound acquisition device 10 acquires sound of a musical instrument played by a performer, or acquires a singing voice of a performer. Then, the sound acquisition device 10 generates the acoustic signal A. For example, the sound acquisition device 10 can be a microphone. The sound acquisition device 10 is connected to the performance analysis device 20, and outputs the generated acoustic signal A to the performance analysis device 20. It is to be noted that when a performer plays a digital musical instrument, a performance signal output from the digital musical instrument can be directly output to the performance analysis device 20. In this case, the sound acquisition device 10 can be omitted. The performance signal, for example, can be a MIDI (Musical Instrument Digital Interface) signal.

The term "performance" or "musical performance" encompasses any musical demonstrations, such as a vocal demonstration.

Figure 8:
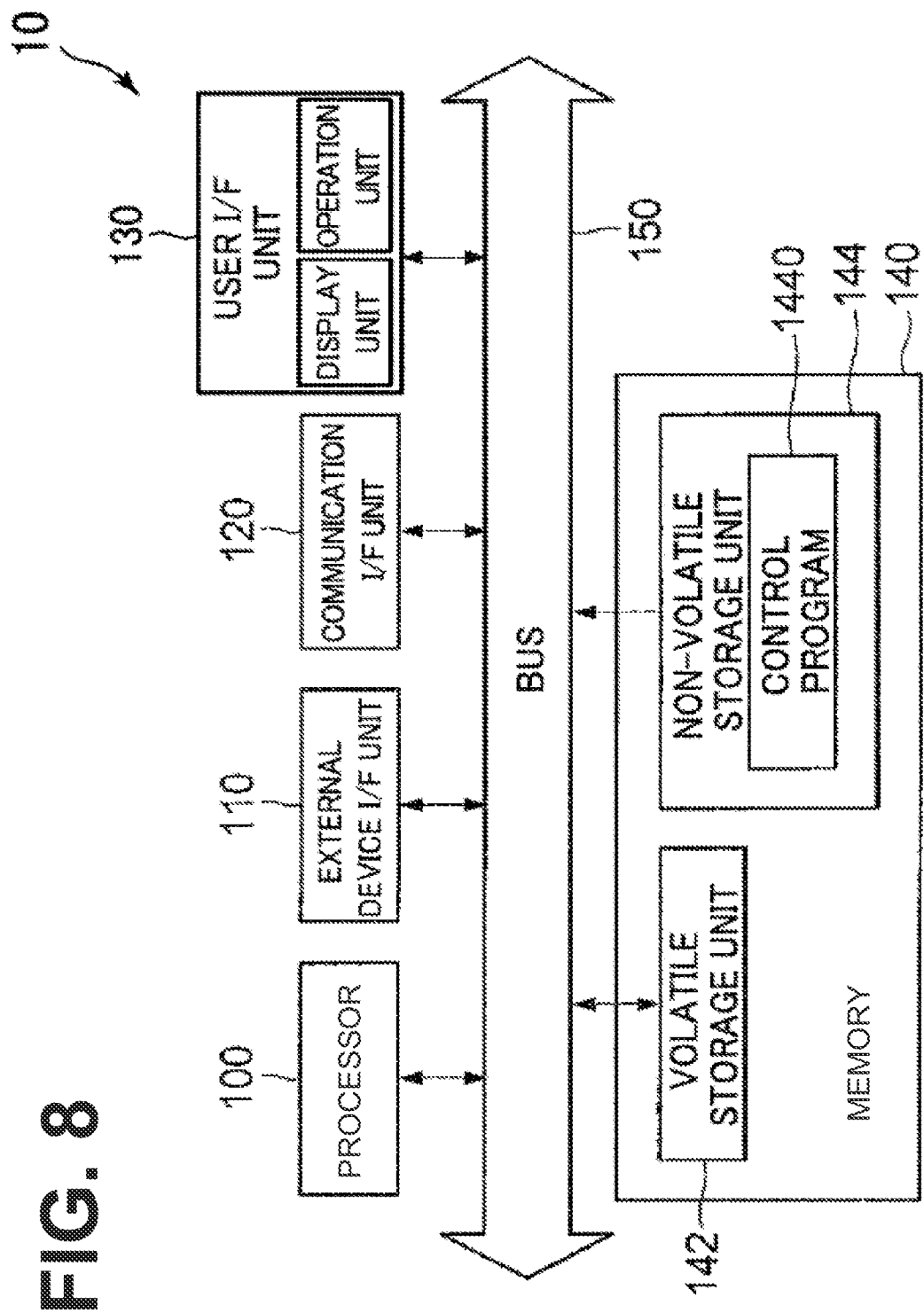
FIG. 8 is a schematic diagram showing components of a general purpose computer.

Referring to FIG. 8, the performance analysis device 20, for example, can be a general purpose computer 10 provided with a memory and a processor. The performance analysis device 20 analyzes the acoustic signal A obtained from the sound acquisition device 10 to estimate musical performance information B. The musical performance information B is associated with the performance indicated by the acoustic signal A. In this analysis, the technique disclosed in JP2015-79183A, the contents of which are incorporated herein by reference in their entirety, can be used. The musical performance information B can be any information associated with a musical performance. In particular, the musical performance information B can be information indicating a position of a musical performance and/or a speed of a musical performance. The performance analysis device 20 is connected to the image control device 30, and outputs the musical performance information B estimated to the image control device 30. The performance analysis device 20 can estimate musical performance information B by analyzing a performance signal obtained from a digital musical instrument.

The input device 50 is a device that is connected to the image control device 30 and that is manipulated by a user when the user inputs a content (instruction) into the input device 50 with reference to the content displayed on a display section 302 (described later by referring to FIG. 5) of the image control device 30. Examples of the input device 50 can include a mouse, a keyboard, and a touch panel. The input device 50 obtains the content input through a manipulation by the user, and generates manipulation information D based on the content obtained. In particular, the manipulation information D can be information indicating a manipulation made by the user with reference to the content displayed on the display section 302. For example, the manipulation information D can be information specifying a playback position and/or a playback speed of an image controlled by the image control device 30. The input device 50 outputs the manipulation information D generated to the image control device 30.

The image control device 30 also can be the same general purpose computer 10 provided with the memory and the processor illustrated in FIG. 8 or another similar computer. The image control device 30 generates image control information C based on the musical performance information B obtained from the performance analysis device 20 or based on the manipulation information D obtained from the input device 50. The image control information C can be information for controlling a playback of an image output from the image output device 40. In particular, the image control information C also can be information indicating a playback position or a playback speed of an image. The image control device 30 is connected to the image output device 40, and outputs the image control information C generated to the image output device 40.

In the image control system 1, the image control device 30 prioritizes the manipulation made by a user (the manipulation information D, which is input through the input device 50) over machine-attributed information (the musical performance information B, which is generated by the performance analysis device 20), and controls the playback of an image according to this priority. Specifically, upon input of the manipulation information D into the image control device 30 while the image control device 30 is controlling the playback of an image based on the musical performance information B, the image control device 30 controls the playback of the image based on the manipulation information D. That is, the image control device 30 controls the playback of an image based on the musical performance information B during the period of time other than the period of time during which the image control device 30 is controlling the playback of the image based on the manipulation information D. With this configuration, at normal time, the user is able to rely on machinery to play back an image at a speed in accordance with the performance speed of a live performance. Also with the above configuration, when a musical piece comes to an important phrase (punchy part), such as a climax, the user is able to manipulate by himself/herself to control the image to create an effective visual effect.

The image output device 40 generates image data M based on the image control information C obtained from the image control device 30. Then, the image output device 40 outputs the image data M generated to a display device (not illustrated), such as a screen. The image data M includes information indicating an image that is to be displayed on the display device.

Figure 2:
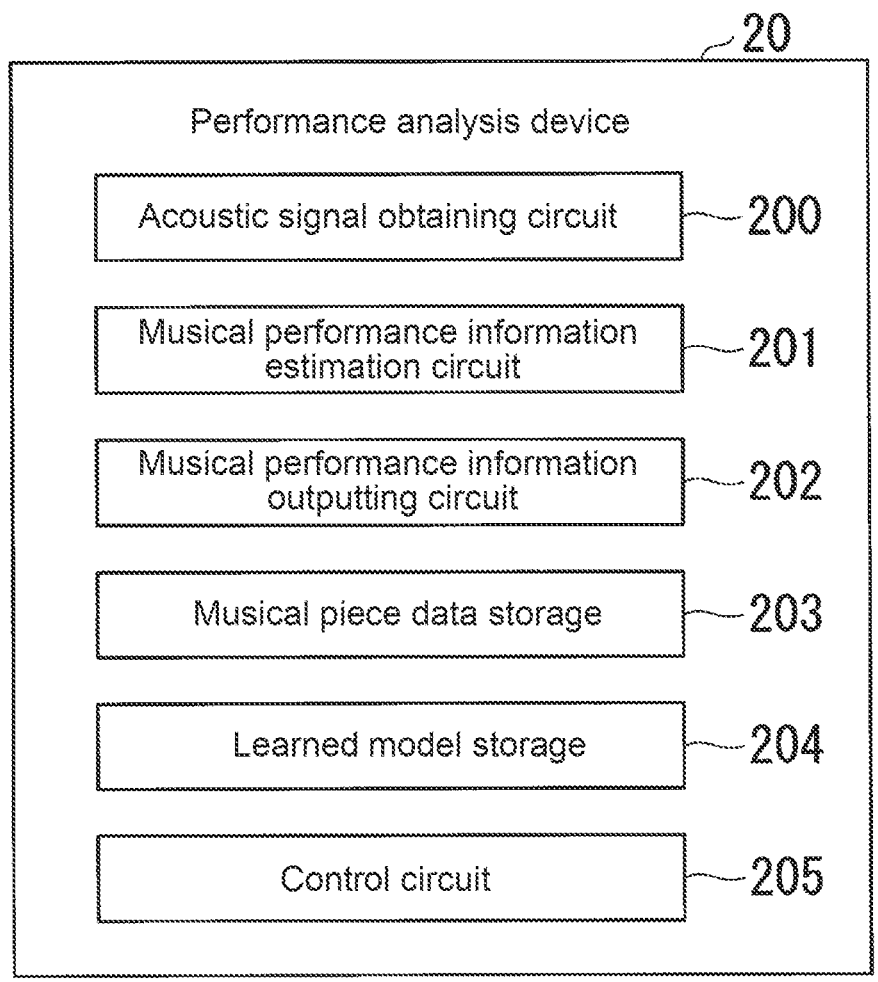
FIG. 2 is a block diagram illustrating an example configuration of a performance analysis device 20 according to the first embodiment.

FIG. 2 is a block diagram illustrating an example configuration of the performance analysis device 20 according to the first embodiment. The performance analysis device 20 can include an acoustic signal obtaining circuit 200 (obtaining circuit), a musical performance information estimation circuit 201 (estimation circuit), a musical performance information outputting circuit 202, a musical piece data storage 203, a trained model storage 204, and a control circuit 205.

The acoustic signal obtaining circuit 200 obtains the acoustic signal A output from the sound acquisition device 10. The acoustic signal obtaining circuit 200 outputs the acoustic signal A obtained to the musical performance information estimation circuit 201.

The musical performance information estimation circuit 201 inputs the acoustic signal A into a trained model to estimate the musical performance information B, which is associated with the performance indicated by the acoustic signal relative to the musical piece A. The musical performance information estimation circuit 201 outputs the musical performance information B estimated to the musical performance information outputting circuit 202.

The trained model can include a model made by performing machine learning of a correlation between learning performance data that is performance data used for learning and a performance position indicated by the learning of the performance data. The machine learning can be any type of machine learning commonly used. Examples thereof can include hidden Markov model (HMM), deep learning, recurrent neural network, convolutional neural network, support vector machine (SVM), decision tree learning, and genetic programming.

For example, the trained model can be a model made by (a) dividing an acoustic signal of a musical piece at predetermined time intervals, thereby obtaining pieces of performance data (learning performance data), (b) generating data in which each of the pieces of performance data is correlated with a different performance position, and (c) performing learning of the resulting data as learning data. Upon input of the acoustic signal A, the trained model can calculate the degree of similarity between the acoustic signal A and the learning performance data obtained by learning. For example, the degree of similarity can be calculated in the form of distance in a vector space between (a) a value obtained by quantifying, in the form of vector representation, a feature quantity of the input acoustic signal A and (b) a value obtained by quantifying, in the form of vector representation, a feature quantity of the learning performance data. The distance in a vector space, which is proportional to the amount of correlation between the values in vector representation, can be calculated by, for example, obtaining a vector inner product. Then, the trained model identifies a performance position correlated with a piece of learning performance data whose vector space distance to the acoustic signal A input is less than a predetermined threshold. That is, the trained model identifies the performance position correlated with a piece of learning performance data similar to the performance position. Then, the trained model outputs this performance position as a performance position estimated from the input acoustic signal A.

The musical performance information B, which is estimated by the musical performance information estimation circuit 201, can be information associated with the position on the musical piece that is being performed as indicated by the acoustic signal A. In this case in particular, the musical performance information B can be information indicating the position on the musical score corresponding to the musical piece. The position can be represented by, for example, the number of musical bars, the beat to which the musical performance corresponds, or ticks, as counted from the start of the musical performance. The musical performance information B also can indicate the performance position in the form of time taken to reach the performance position from the time of start of the musical performance, under the assumption that the musical piece is performed at a speed dictated on the musical score (as indicated by a speed symbol or a technical term for speed). In this case, based on the performance position estimated, the musical performance information estimation circuit 201 obtains, from the musical piece data storage 203, the speed dictated on the musical score corresponding to the musical piece. The musical performance information estimation circuit 201 uses the obtained speed on the musical score to convert the performance position into the time taken to reach the performance position from the time of start of the musical performance. In this manner, the musical performance information estimation circuit 201 derives the musical performance information B.

When the musical performance information B includes information on a performance speed indicating a speed of the musical performance, the musical performance information estimation circuit 201 can derive the performance speed by obtaining a time derivative of the performance position. The musical performance information estimation circuit 201 can estimate the performance speed using a trained model generated by learning of learning data in which pieces of learning performance data are correlated with respective performance speeds.

Upon obtaining playback information from the image control device 30, the musical performance information estimation circuit 201 sets (updates) the content (such as the playback position and the playback speed) of the musical performance information B to a content corresponding to the obtained playback information. When the playback information includes information indicating the position (playback position) or the playback speed at which the image control device 30 is currently playing back an image, if the musical performance information B, which is estimated by the musical performance information estimation circuit 201, deviates from an actual performance position, the musical performance information B can be re-set to the correct performance position.

The musical performance information outputting circuit 202 outputs the musical performance information B, which is estimated by the musical performance information estimation circuit 201, to the image control device 30.

The musical piece data storage 203 stores musical piece data equivalent to a musical score of a musical piece performed by a performer. The musical piece data can be time-series data in which pitch, sound volume, and pronunciation period are specified for each of the musical notes constituting a musical piece. For example, the musical piece data can be a MIDI file (SMF, Standard MIDI File).

The trained model storage 204 can store the trained model.

The control circuit 205 can be a processing circuit, such as a CPU (Central Processing Unit). The control circuit 205 can control the elements of the performance analysis device 20 integrally.

One aspect of the present development can include (a) storing data in a storage device (for example, a cloud storage) separate from the performance analysis device 20, (b) connecting the storage device to the control circuit 205 through a mobile communication network or another kind of communication network such as the Internet, and (c) causing the control circuit 205 to write and/or read data to and from the storage device through the network so that the information is stored in and/or read from the musical piece data storage 203 and the trained model storage 204. The musical piece data storage 203 and the trained model storage 204, however, can be located elsewhere (other than in the performance analysis device 20).

Figure 3:
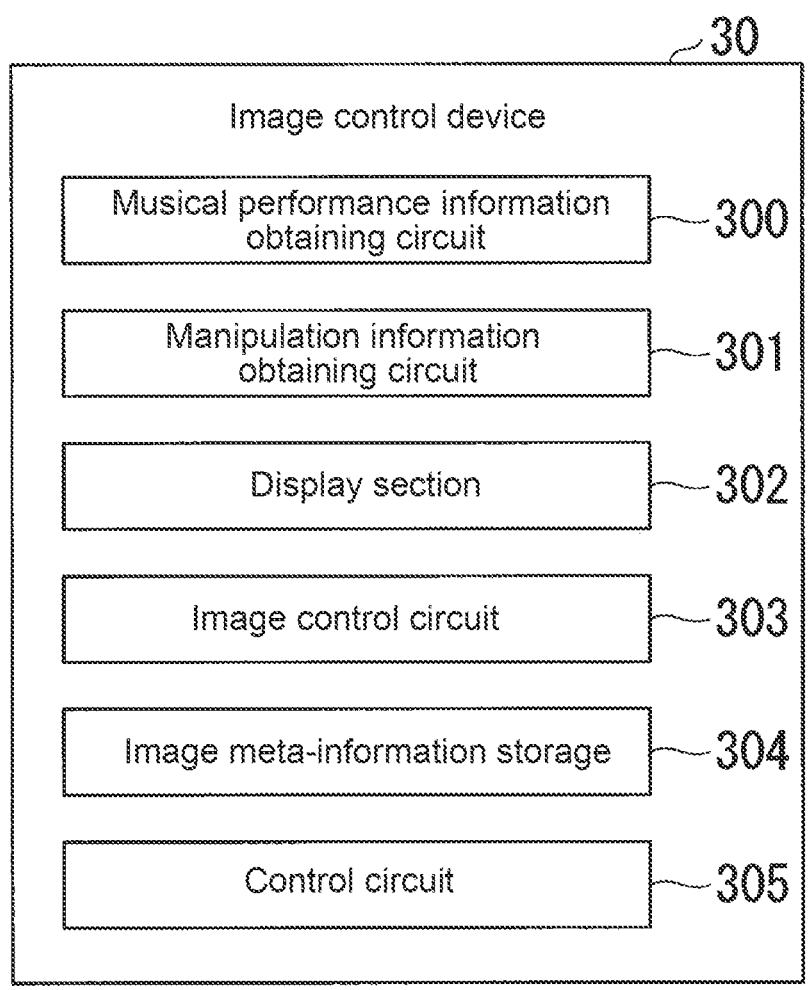
FIG. 3 is a block diagram illustrating an example configuration of an image control device 30 according to the first embodiment.

FIG. 3 is a block diagram illustrating an example configuration of the image control device 30 according to the first embodiment. The image control device 30 can include a musical performance information obtaining circuit 300, a manipulation information obtaining circuit 301 (obtaining circuit), the display section 302, an image control circuit 303, the image meta-information storage 304 (storage), and a control circuit 305.

The musical performance information obtaining circuit 300 obtains the musical performance information B from the performance analysis device 20. The musical performance information obtaining circuit 300 outputs the musical performance information B obtained to the image control circuit 303.

The manipulation information obtaining circuit 301 obtains the manipulation information D from the input device 50. The manipulation information obtaining circuit 301 outputs the manipulation information D obtained to the image control circuit 303.

The display section 302, for example, can be a liquid crystal display. The display section 302 displays screens for the user to manipulate a playback of an image. Examples of the screens can include a menu screen, a manipulation screen, and a setting screen.

The image control circuit 303 can control the playback of an image based on the musical performance information B or the manipulation information D,T depending on the content set in advance by the user. The image control circuit 303 performs this control for each of the sections of a musical piece performed by a performer.

For the section where an image is controlled based on the musical performance information B, the image control circuit 303 generates image control information C that specifies the image position and/or the image speed corresponding to the musical performance information B.

For the section where the image is controlled based on the manipulation information D, the image control circuit 303 generates image control information C that corresponds to the image position and/or the image speed indicated by the manipulation information D.

Upon obtaining the manipulation information D from the manipulation information obtaining circuit 301 while the image control circuit 303 is controlling the image based on the musical performance information B, the image control circuit 303 performs control based on the manipulation information D. Specifically, when the image control circuit 303 obtains the manipulation information D from the manipulation information obtaining circuit 301 during performance of the section where the image is controlled based on the musical performance information B, the image control circuit 303 switches this section to the section where the image is controlled based on the manipulation information D. That is, even while the image control circuit 303 is performing machine-using control (control based on the musical performance information B), the image control circuit 303 prioritizes a user-instructed control (control based on the manipulation information D) upon the user performing manipulation for the user-instructed control.

Upon a the user manipulating to instruct control to be performed based on the musical performance information B while the image control circuit 303 is controlling an image based on the manipulation information D, the image control circuit 303 performs control based on the musical performance information B. Upon the user manipulating to instruct control to be performed based on the musical performance information B during performance of the section where an image is controlled based on the manipulation information D, the image control circuit 303 switches this section to the section where the image is controlled based on the musical performance information B. That is, based on the user instruction (to perform control based on the musical performance information B or the manipulation information D), the image control circuit 303 follows the instruction input by the user.

When the manipulation information obtaining circuit 301 obtains instruction information while the image control circuit 303 is performing control based on the manipulation information D, the image control circuit 303 outputs playback information to the musical performance information estimation circuit 201 of the performance analysis device 20. The instruction information can be information indicating an instruction to control the playback of an image based on the musical performance information B. The playback information can be information indicating the position (playback position) or the playback speed at which an image is currently being played back. This configuration ensures smooth switching from the manual control (control based on the manipulation information D) to the automatic control (control based on the musical performance information B), eliminating or minimizing changes in the playback position or the playback speed of the image at the time of the switch.

The image control circuit 303 uses image meta-information while the image control circuit 303 is performing a control based on the manipulation information D. The image meta-information, which can be stored in the image meta-information storage 304, can include information in which a target image, which is a target of user manipulation, is correlated with meta-information indicating a content (playback mode) of the playback of the target image. The meta-information can be information indicating a playback content. Examples thereof can include information indicating whether a playback is performed or not, whether a stopping is performed or not, whether a jump-cut is performed or not, and whether a looping is performed or not. The information indicating whether a playback is performed or not is information indicating whether to proceed (play back) the playback position of the target image after the target image is displayed. The information indicating whether a stopping is performed or not is information indicating whether to stop the proceeding of a target image after the target image is displayed. The information indicating whether a jump-cut is performed or not is information indicating, when a target image is displayed, whether to switch the currently displayed image directly to the target image, jumping (jump-cutting) the in-between image existing between the current image and the target image. The information indicating whether a looping is performed or not is information indicating, at the end of the playback of the target image, whether to repeat (loop) the playback of the target image.

The control circuit 305 can be a processing circuit, such as a CPU. The control circuit 305 controls the elements of the image control device 30 integrally.

FIG. 4 illustrates an example of the image meta-information stored in the image meta-information storage 304 according to the first embodiment. In FIG. 4, the image meta-information includes the following items: Item, Seconds, Marker information RGB, Playback, Stop, Jump-cut, Loop, and AI application (automatic control application).

The item Item is a number assigned to a content registered as image meta-information. The item Seconds is information indicating an image position in the form of an elapse of time (e.g., second) counted from the time of start of the image. The item Marker information RGB is information indicating, using an RGB value, the frame color of each of thumbnails (images G6 to G9 illustrated in FIG. 5) of images registered on the manipulation display screen (see FIG. 5). This configuration ensures that even when there is a large number of images to register, the user is able to easily identify the thumbnail of a manipulation-target image.

The item Playback is information indicating, after a registered image is displayed, whether to proceed the playback of the image. The item Stop is information indicating, after a registered image is displayed, whether to stop the proceeding of the image. The item Jump-cut is information indicating, when a registered image is displayed, whether to cut the image existing before the registered image. The item Loop is information indicating, at the end of the playback of a registered image, whether to play back the image again. The item AI application is information indicating whether to apply image control using the machine (automatic image control using the performance analysis device 20).

In FIG. 4, registered images include an image at the start time (0 seconds later), an image of 1 second later, an image of 630.8 seconds later, and an image of 1274.50 seconds later, among other images. The initial image of 0 seconds later is played back, and AI is not applied to the playback control of the section starting from 0 seconds. In contrast, AI is applied to the playback control of the section starting from 630.8 seconds.

Figure 5:
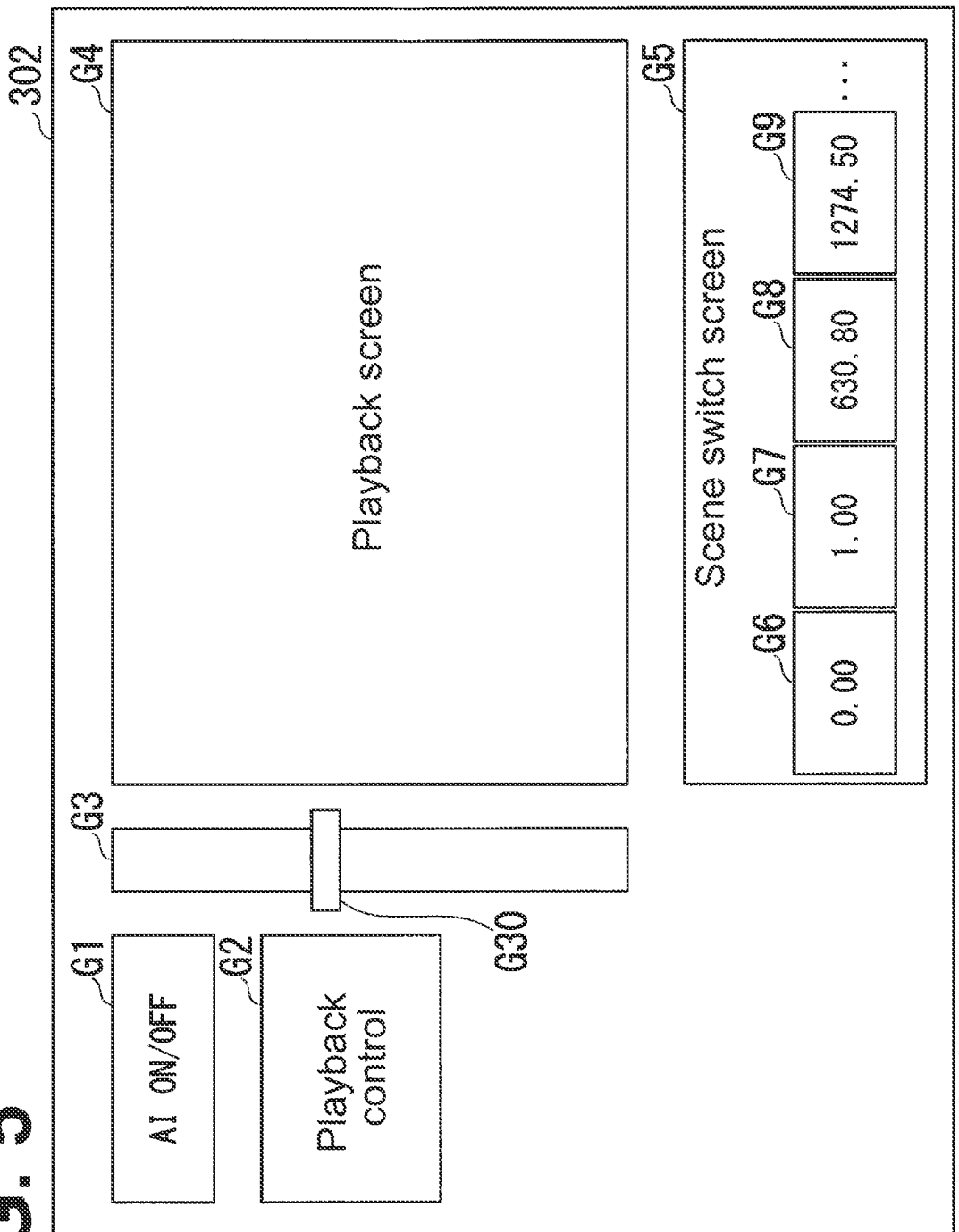
FIG. 5 illustrates an example of display content displayed on a display section 302 according to the first embodiment.

FIG. 5 illustrates an example of display content on the display section 302 according to the first embodiment. As illustrated in the FIG. 5, the display section 302 displays images G1 to G9. The image G1 can be a manipulation button for instructing whether to apply AI application (whether to perform an image control using the performance analysis device 20). Upon clicking on the image G1 while AI (automatic control) is applied, the image control can be switched to a manual control. Upon clicking on the image G1 while AI (automatic control) is not applied (during a manual control), the image control can be switched to AI (automatic control). The image G2 can be where manipulation buttons for controlling playback of an image are provided. Specifically, manipulation buttons, such as Playback, Stop, Fast-forward, and Unwind, can be provided on the image G2. The image G3 can be a slide bar (tab) for adjusting the playback speed. The playback speed can be adjusted by manipulating the slide bar upward and downward. For example, the playback speed can be increased by moving the image G30 upward, and the playback speed can be decreased by moving the image G30 downward.

The image G4 can be a playback screen on which an image currently being played back is displayed. The image G5 can be an image where the user can manipulate to select or switch to a desired image registered as image meta-information. The images G6 to G9 are thumbnail images each representing the image located at the head position of each image registered as image meta-information. The image G6 can be an image captured at an elapse of 0 seconds from the time of start of the image. The image G7 can be an image captured at an elapse of 1 second from the time of start of the image. The image G8 can be an image captured at an elapse of 630.80 seconds from the time of start of the image. The image G9 can be an image captured at an elapse of 1274.50 seconds from the time of start of the image.

Figure 6:
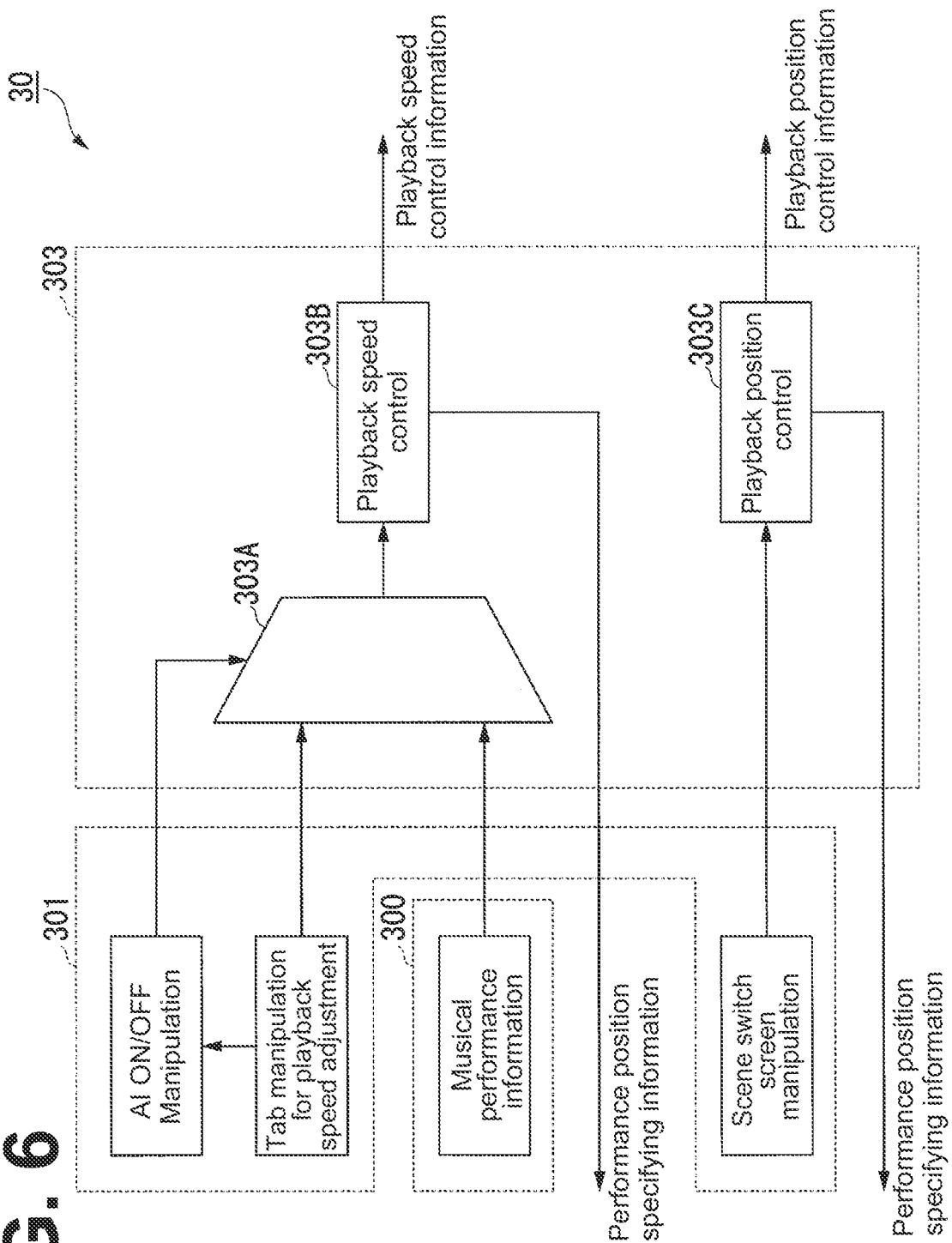
FIG. 6 is a diagram illustrating how the image control device 30 according to the first embodiment operates.

FIG. 6 is a diagram illustrating how the image control device 30 according to the first embodiment operates. The musical performance information B, which is obtained by the musical performance information obtaining circuit 300, is input into the selector 303A of the image control circuit 303. Also, a manipulation signal obtained by the manipulation information obtaining circuit 301 is input to the selector 303A. This manipulation signal corresponds to the manipulation for adjusting the playback speed of the image (manipulation of moving the slide bar in the image G30). This manipulation signal is also converted into a manipulation signal indicating manipulation of turning AI (automatic control) OFF. Specifically, the manipulation signal obtained by the manipulation information obtaining circuit 301 is converted into manipulation of switching AI application from ON to OFF (manipulation of clicking on the image G1). This converted manipulation is input into the selector 303A as a manipulation signal indicating manipulation of turning AI OFF. This manipulation signal is input into the selector 303A as a signal indicating control of determining whether to output a signal from the selector 303A. That is, when a manipulation signal indicating manipulation of turning AI OFF has been input into the selector 303A, a manipulation signal is output from the selector 303A. When a manipulation signal indicating manipulation of turning AI ON has been input into the selector 303A, no manipulation signal is output from the selector 303A.

The manipulation signal output from the selector 303A is input into a functional circuit (playback speed control circuit) 303B of the image control circuit 303. The functional circuit 303B is a functional circuit configured to control the playback speed. The functional circuit 303B generates image control information C based on the manipulation signal obtained, and outputs the image control information C generated (as playback speed control information) to the image output device 40. The functional circuit 303B also outputs (feeds back) the image control information C generated (as performance position specifying information) to the performance analysis device 20. As seen from this example, after switching to the manual mode, the functional circuit 303B can periodically feed back the image control information C (performance position specifying information) to the performance analysis device 20.

The manipulation information obtaining circuit 301 obtains a manipulation signal indicating a manipulation with respect to a scene switch screen, on which images are switched (manipulation of clicking on the images G6 to G9). This manipulation signal is input into a functional circuit (playback position control circuit) 303C of the image control circuit 303. The functional circuit 303C, which is configured to control the playback position, generates image control information C (as playback position control information) based on the input manipulation signal, and outputs the image control information C generated to the image output device 40. The functional circuit 303C also outputs (feeds back) the image control information C generated (as performance position specifying information) to the performance analysis device 20. As seen from this example, after the user has switched between images, the functional circuit 303C can periodically feed back the image control information C (performance position specifying information) to the performance analysis device 20.

Figure 7:
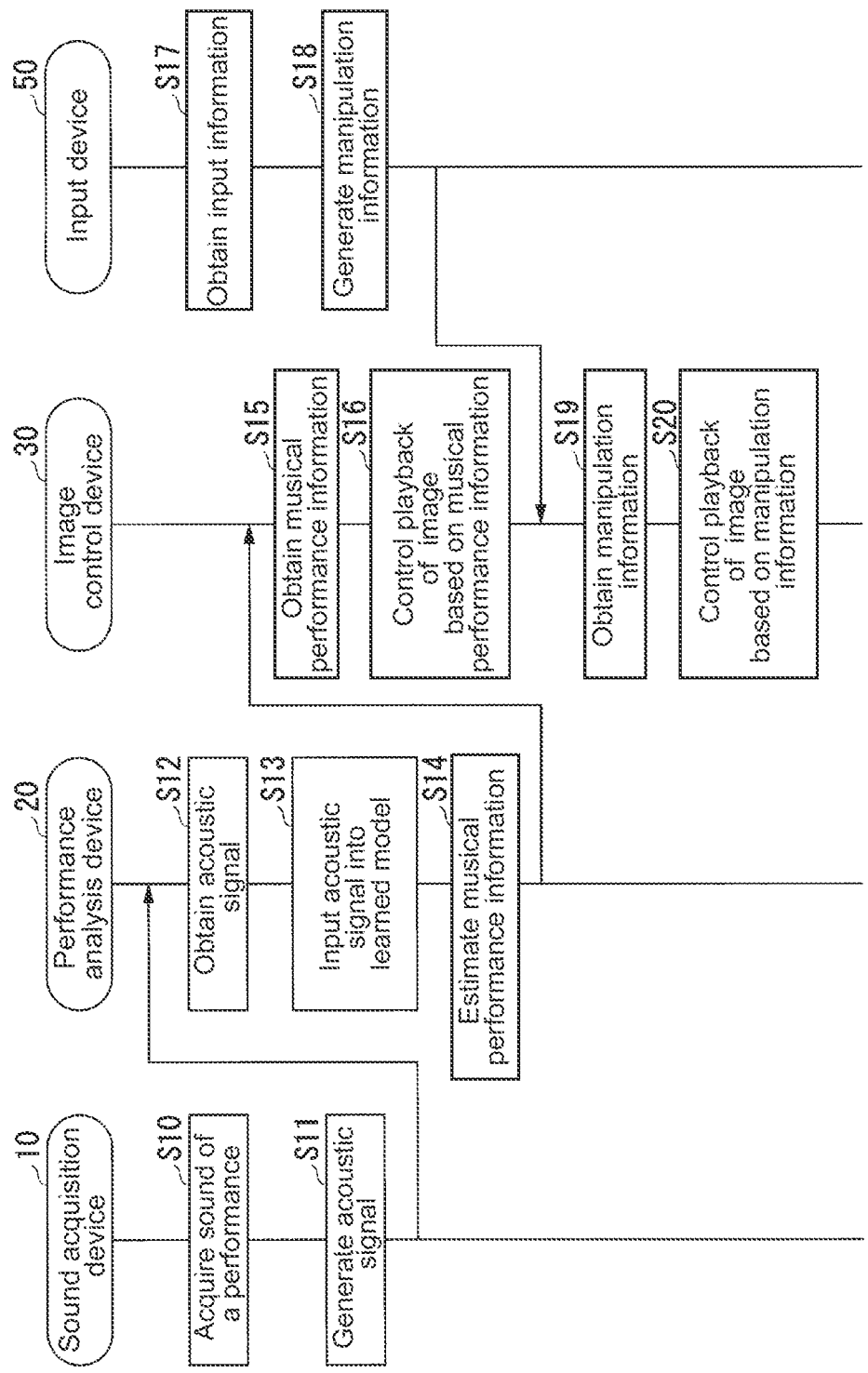
FIG. 7 is a sequence diagram illustrating a flow of how the image control system 1 according to the first embodiment operates.

FIG. 7 is a sequence diagram illustrating a flow of how the image control system 1 according to the first embodiment operates. The sound acquisition device 10 acquires sound of a musical performance (a live performance, a real-time performance) (step S10), and generates an acoustic signal A using the acquired sound (step S11). The sound acquisition device 10 outputs the generated acoustic signal A to the performance analysis device 20.

The performance analysis device 20 obtains the acoustic signal A from the sound acquisition device 10 (step S12), and inputs the acoustic signal A obtained into a trained model (step S13). The performance analysis device 20 regards an output from the trained model as musical performance information B estimated in the acoustic signal A (step S14). The performance analysis device 20 can also estimate musical performance information B based on an output from the trained model. The performance analysis device 20 outputs the musical performance information B estimated to the image control device 30.

The image control device 30 obtains the musical performance information B from the performance analysis device 20 (step S15), and controls the playback of an image based on the musical performance information B obtained (step S16). Input information is input into the input device 50 (step S17). The input information indicates an input manipulated by the user. The input device 50 generates manipulation information D using input information (step S18). The input device 50 outputs the manipulation information D generated to the image control device 30. Upon obtaining of the manipulation information D from the input device 50 (step S19), the image control device 30 switches the control of the playback of the image to the control based on the manipulation information D (step S20).

As has been described hereinbefore, the image control system 1 according to the first embodiment includes the musical performance information estimation circuit 201, the manipulation information obtaining circuit 301, and the image control circuit 303. The musical performance information estimation circuit 201 estimates musical performance information B based on an output that a trained model has made in response to an input of an acoustic signal A, which indicates a performance of a musical piece. The musical performance information B is associated with the performance indicated by the acoustic signal relative to the musical piece A. The manipulation information obtaining circuit 301 obtains manipulation information D, which indicates manipulation that is input by a user and that is associated with the playback of an image. The image control circuit 303 controls the playback of the image based on the musical performance information B, which is estimated by the musical performance information estimation circuit 201, or based on the manipulation information D, which is obtained by the manipulation information obtaining circuit 301. Upon obtaining of the manipulation information D by the manipulation information obtaining circuit 301, the image control circuit 303 controls the playback of the image based on the manipulation information D.

With this configuration, the image control system 1 according to the first embodiment is capable of controlling images based on musical performance information. As a result, even a user without any special skill is able to control images in tune with a musical piece. Also, with the above configuration, upon obtaining of the manipulation information D from a user, the image control system 1 controls the playback of an image based on the manipulation information D. This ensures that images can be controlled by a user's manipulations when a musical piece comes to an important phrase (punchy part), such as a climax or in unexpected situations such as when the sound acquisition device 10 breaks down and is unable to input an acoustic signal A into the performance analysis device 20. As a result, a more effective visual effect can be created.

Also in the image control system 1 according to the first embodiment, the trained model is a model made by performing a machine learning of a correlation between (a) learning performance data, which is performance data, used for learning and (b) a position or a speed of the performance of the musical piece indicated by the learning performance data. The musical performance information B, which is estimated by the musical performance information estimation circuit 201, is associated with the position or the speed of the performance indicated by the acoustic signal relative to the musical piece A. With this configuration, the image control system 1 according to the first embodiment is capable of controlling the playback position and/or the playback speed of an image based on the position and/or the speed of a musical performance indicated by musical performance information. As a result, even in situations where a live performance proceeds at a low or high performance speed (tempo), an image can be played back at the speed in tune with the performance speed of the live performance.

Also in the image control system 1 according to the first embodiment, it is possible for the manipulation information obtaining circuit 301 to obtain instruction information while the image control circuit 303 is controlling the playback of the image based on the manipulation information D. The instruction information is information that instructs to control the playback of the image based on the musical performance information. Upon obtaining of the instruction information by the manipulation information obtaining circuit 301, the image control circuit 303 outputs playback information to the musical performance information estimation circuit 201. The playback information is associated with a speed of the playback of the image. Upon obtaining the playback information from the image control circuit 303, the musical performance information estimation circuit 201 sets (updates) the musical performance information based on the playback information.

With this configuration, the image control system 1 according to the first embodiment is capable of switching user-manipulated control (manual control) of an image to machine-using control (automatic control using the musical performance information estimation circuit 201). Also, with the above configuration, at the time when the user-manipulated control is switched to the machine-using control, the machine is notified of the current playback speed and/or the current playback position. This eliminates or minimizes changes in the playback position and/or the playback speed of the image at the time of the switching to the machine-using control. Thus, a smooth switch can be realized.

The image control system 1 according to the first embodiment can further include the image meta-information storage 304. The image meta-information storage 304 can store information in which a target image, which is a manipulation target, is correlated with meta-information indicating a method of playing back the target image. The manipulation information D can be information indicating a target image (choice information indicating a choice of a target image). When the manipulation information obtaining circuit 301 obtains information indicating a target image as the manipulation information D, the image control circuit 303 plays back the target image by the playback mode indicated by the meta-information. With this configuration, when a user manually controls an image, the image control system 1 according to the first embodiment is capable of recording (registering) meta-information in which an image that the user wants to display (target image) is correlated with a method of playing back the image (for example, the method is to wait or repeat (loop) a playback of a predetermined image section). This ensures that the user only has to choose an image registered as meta-information in advance when the user wants the image to be played back in the manner registered in the meta-information. Thus, it is not necessary for the user to manipulate stopping or looping of the image. This enables the user to focus on adjustment of the playback speed.

Also, the image control system 1 according to the first embodiment can include the performance analysis device 20 and the image control device 30. The performance analysis device 20 includes the musical performance information estimation circuit 201, and transmits musical performance information. The image control device 30 includes the manipulation information obtaining circuit 301 and the image control circuit 303, and receives musical performance information B. This configuration provides advantageous effects similar to the above-described advantageous effects.

Modification of First Embodiment

Next, a modification of the first embodiment will be described. In this modification, the performance analysis device 20 is different from the performance analysis device 20 according to the first embodiment in that the trained model storage 204 stores a plurality of trained models.

Each of the plurality of trained models can be a model made by learning of learning data corresponding to a different type of musical piece, namely a genre unique in performance style. Examples of the type of musical piece include orchestral music, chamber music, vocal music, and rock music.

Among the plurality of trained models, one trained model can be associated with orchestral music. Specifically, pieces of performance data (learning performance data) can be generated by dividing various orchestral performances at predetermined intervals. Then, data can be generated in which the pieces of performance data are correlated with respective performance positions. Then, the one trained model can be generated by learning of the data generated as learning data. Among the plurality of trained models, another trained model can be associated with chamber music. Specifically, pieces of performance data (learning performance data) can be generated by dividing various chamber music performances at predetermined intervals. Then, data can be generated in which the pieces of performance data are correlated with respective performance positions. Then, the another trained model is made by learning of the data generated as learning data. The same applies in other genres, such as vocal music and rock music.

Thus, in this modification, a plurality of trained models can be used. Each trained model can have a different learning content obtained by learning of learning data of a unique musical genre (type).

When a performer plays a genre of musical piece, switching is performed to the trained model corresponding to this genre for estimation purposes. For example, when a performer plays orchestral music, the trained model made by learning of orchestral performances can be used. When a performer plays chamber music, the trained model made by learning of chamber music performances can be used. The same applies in other genres, such as vocal music and rock music.

As has been described hereinbefore, in the image control system 1 according to the modification of the first embodiment, a plurality of trained models are provided each corresponding to a different type of musical piece. The musical performance information estimation circuit 201 estimates musical performance information B using a trained model corresponding to the type of musical piece indicated by the acoustic signal A. With this configuration, the image control system 1 according to the modification of the first embodiment is capable of estimating musical performance information B using a trained model corresponding to the type (genre) of musical piece played. This ensures that the musical performance information B estimated is more reliably indicative of a feature unique to the genre, such as orchestral music, chamber music, rock music, and vocal music (an example feature is that a musical performance is frequently changeable in tempo or least changeable in tempo). As a result, an image is played back more in tune with the musical piece played.

It is to be noted that the entirety or part of the image control system 1 according to the first embodiment or according to the modification of the first embodiment can be implemented by a computer. In this case, a program for implementing the functions of the image control system 1 can be recorded or stored in a computer readable recording medium, and the stored program can be read into a computer system and executed in the computer system. The computer system encompasses hardware, such as a processor, a memory, and peripheral equipment, and OS (Operating System). The computer readable recording medium includes a transportable medium, such as a flexible disk, a magneto-optical disk, a ROM (Read Only Memory), a CD-ROM (Compact Disk Read Only Memory), and a storage device, such as a hard disk, a medium that dynamically holds a program for a short period of time, and a memory that holds a program for a predetermined period of time, such as a volatile memory built in a computer system serving as a client or a server in cases where a communications line is used as described above. It is also to be noted that the above-described program can be used to implement part of the above-described functions. It is further to be noted that the above-described program can be used to implement the above-described functions in combination with a program already recorded in the computer system. It is further to be noted that the above-described program can be implemented using a programmable logic device such as an FPGA (Field-Programmable Gate Array).

FIG. 8 is a schematic diagram showing components of the general purpose computer 10.

As illustrated in FIG. 8, the general purpose computer 10 includes a control unit 100, an external apparatus I/F unit 110, a communication I/F unit 120, a user I/F unit 130, a memory 140, and a bus 150 through which data is exchanged among the components of the general purpose computer 10.

The control unit 100 is, for example, a central processing unit (CPU). The control unit 100 functions as the center of control of the general purpose computer 10 by operating as programmed by a control program 1440, which is stored in the memory 140.

The external apparatus I/F unit 110 is an aggregation of I/Fs for connecting external apparatus via signal lines, for example, serial I/Fs or parallel I/Fs. The external apparatus I/F unit 110 passes a signal received from a connected apparatus that is connected to the external apparatus I/F unit 110 to the control unit 100, and transmits a signal received from the control unit 100 to the connected apparatus. An analog apparatus to/from which an analog signal is input/output can be connected to the external apparatus I/F unit 110 when the external apparatus I/F unit 110 includes an A/D converter and a D/A converter. In this case, the external apparatus I/F unit 110 performs A/D conversion with the use of the A/D converter on an analog signal received from the connected apparatus to pass digital data that is the result of the A/D conversion to the control unit 100, and performs D/A conversion with the use of the D/A converter on digital data received from the control unit 100 to output an analog signal that is the result of the D/A conversion to the connected apparatus.

The communication I/F unit 120 is, for example, a network interface card (NIC). The communication I/F unit 120 is connected to a telecommunication line to receive data transmitted from an other apparatus such as a contents server via the telecommunication line, and passes the received data to the control unit 100. The communication I/F unit 120 also sends data passed from the control unit 100 to another apparatus via the telecommunication line.

The user I/F unit 130 includes a display unit and an operation unit. The display unit is made up of, for example, a liquid crystal display and a drive circuit for driving the liquid crystal display. The display unit displays various images under control of the control unit 100. The operation unit includes an input device, for example, a numeric keypad or a pointing device. When the user operates the input device, the operation unit passes operation data indicating the specifics of the operation by the user to the control unit 100. The control unit 100 is informed of the specifics of operation by the user in this manner.

The memory 140 includes a volatile storage unit 142 and a non-volatile storage unit 144 as illustrated in FIG. 8. The volatile storage unit 142 is, for example, a random access memory (RAM). The volatile storage unit 142 is used by the control unit 100 as a work area when the control program 1440 is executed. The non-volatile storage unit 144 is, for example, a hard disk drive or an electrically erasable programmable read-only memory (EEPROM). The control program 1440 is stored in the non-volatile storage unit 144 in advance.

While an embodiment of the present disclosure and a modification of the embodiment have been described, the embodiment and the modification are intended as illustrative only and are not intended to limit the scope of the present disclosure. It will be understood that the present disclosure can be embodied in other forms without departing from the scope of the present disclosure, and that other omissions, substitutions, additions, and/or alterations can be made to the embodiment and the modification. Thus, these embodiments and modifications thereof are intended to be encompassed by the scope of the present disclosure. The scope of the present disclosure accordingly is to be defined as set forth in the appended claims.

What is claimed is:

1. An image control system for controlling displaying of images in tune with a performance of a musical piece, the image control system comprising:
an estimation circuit configured to:
receive an acoustic signal representing the performance of the musical piece; and
input the received acoustic signal to a trained model to obtain estimated musical performance information, which is associated with the performance of the musical piece;
an obtaining circuit configured to obtain manipulation information indicating manipulation input by a user and that is associated with a playback of the images; and
an image control circuit configured to control the images to be output to a display device in tune with the performance of the musical piece based on:
the estimated musical performance information; and
the obtained manipulation information.

2. The image control system according to claim 1, wherein the trained model is generated by a machine learning of a correlation between:
learning performance data used for a learning; and
a position or a speed of the performance of the musical piece indicated by the learning performance data.

3. The image control system according to claim 2, wherein the estimation circuit is configured to estimate the musical performance information, which is associated with the position or the speed of the performance indicated by the acoustic signal relative to the musical piece.

4. The image control system according to claim 3, wherein:
the obtaining circuit is configured to obtain instruction information instructing switching from control of the playback of the images based on the manipulation information to control the playback of the images based on the musical performance information,
upon the obtaining circuit obtaining the instruction information, the image control circuit is configured to output playback information to the estimation circuit, the playback information being associated with a position of the playback of the images, and
the estimation circuit is configured to set the musical performance information based on the playback information output by the image control circuit.

5. The image control system according to claim 4, further comprising:
an image meta-information storage storing information that correlates a target image with meta-information indicating a playback mode of playing back the target image,
wherein the manipulation information comprises choice information indicating a choice of the target image, and
wherein upon the obtaining circuit obtaining the choice information by the obtaining circuit, the image control circuit is configured to play back the target image by the playback mode indicated by the meta-information.

6. The image control system according to claim 3, further comprising:
an image meta-information storage storing information that correlates a target image with meta-information indicating a playback mode of playing back the target image,
wherein the manipulation information comprises choice information indicating a choice of the target image, and
wherein upon the obtaining circuit obtaining the choice information, the image control circuit is configured to play back the target image by the playback mode indicated by the meta-information.

7. The image control system according to claim 2, wherein:
the obtaining circuit is configured to obtain instruction information instructing switching from control of the playback of the images based on the manipulation information to control the playback of the images based on the musical performance information,
upon the obtaining circuit obtaining the instruction information, the image control circuit is configured to output playback information to the estimation circuit, the playback information being associated with a position of the playback of the images, and
the estimation circuit is configured to set the musical performance information based on the playback information output by the image control circuit.

8. The image control system according to claim 7, further comprising:
an image meta-information storage storing information that correlates a target image with meta-information indicating a playback mode of playing back the target image,
wherein the manipulation information comprises choice information indicating a choice of the target image, and
wherein upon the obtaining circuit obtaining the choice information, the image control circuit is configured to play back the target image by the playback mode indicated by the meta-information.

9. The image control system according to claim 2, further comprising:
an image meta-information storage storing information that correlates a target image with meta-information indicating a playback mode of playing back the target image,
wherein the manipulation information comprises choice information indicating a choice of the target image, and
wherein upon the obtaining circuit obtaining the choice information, the image control circuit is configured to play back the target image by the playback mode indicated by the meta-information.

10. The image control system according to claim 1, wherein the estimation circuit is configured to estimate the musical performance information, which is associated with a position or a speed of the performance indicated by the acoustic signal relative to the musical piece.

11. The image control system according to claim 10, wherein:
the obtaining circuit is configured to obtain instruction information instructing switching from control of the playback of the images based on the manipulation information to control the playback of the images based on the musical performance information,
upon the obtaining circuit obtaining the instruction information, the image control circuit is configured to output playback information to the estimation circuit, the playback information being associated with a position of the playback of the images, and the estimation circuit is configured to set the musical performance information based on the playback information output by the image control circuit.

12. The image control system according to claim 11, further comprising:

an image meta-information storage storing information that correlates a target image with meta-information indicating a playback mode of playing back the target image, wherein the manipulation information comprises choice information indicating a choice of the target image, and wherein upon the obtaining circuit obtaining the choice information, the image control circuit is configured to play back the target image by the playback mode indicated by the meta-information.

13. The image control system according to claim 10, further comprising:

an image meta-information storage storing information that correlates a target image with meta-information indicating a playback mode of playing back the target image, wherein the manipulation information comprises choice information indicating a choice of the target image, and wherein upon the obtaining circuit obtaining the choice information, the image control circuit is configured to play back the target image by the playback mode indicated by the meta-information.

14. The image control system according to claim 1, wherein:

the obtaining circuit is configured to obtain instruction information instructing switching from control of the playback of the images based on the manipulation information to control the playback of the images based on the musical performance information, upon the obtaining circuit obtaining the instruction information, the image control circuit is configured to output playback information to the estimation circuit, the playback information being associated with a position of the playback of the images, and the estimation circuit is configured to set the musical performance information based on the playback information output by the image control circuit.

15. The image control system according to claim 14, further comprising:

an image meta-information storage storing information that correlates a target image with meta-information indicating playback mode of playing back the target image, wherein the manipulation information comprises choice information indicating a choice of the target image, and wherein upon the obtaining circuit obtaining the choice information, the image control circuit is configured to play back the target image by the playback mode indicated by the meta-information.

16. The image control system according to claim 1, further comprising:

an image meta-information storage storing information that correlates a target image with meta-information indicating a playback mode of playing back the target image, wherein the manipulation information comprises choice information indicating a choice of the target image, and wherein upon the obtaining circuit obtaining the choice information, the image control circuit is configured to play back the target image by the playback mode indicated by the meta-information.

17. The image control system according to claim 1, wherein:

the trained model comprises a plurality of trained models respectively corresponding to different types of musical pieces, and the estimation circuit is configured to estimate the musical performance information using a trained model, among the plurality of trained models, that corresponds to a type of the musical piece corresponding to the acoustic signal.

18. The image control system according to claim 1, wherein the acoustic signal indicates a live performance.

19. The image control system according to claim 1, further comprising:

a performance analysis device comprising the estimation circuit and configured to transmit the musical performance information; and an image control device comprising the obtaining circuit and the image control circuit and configured to receive the musical performance information.

20. The image control system according to claim 1, wherein the image control circuit controlling the images to be output to the display device includes controlling at least one of a playback position or speed of the images to be output to the display device.

21. A method of controlling displaying of images in tune with a performance of a musical piece, the method comprising:

receiving, via an estimation circuit, an acoustic signal representing the performance of the musical piece;

inputting, via the estimation circuit, the received acoustic signal to a trained model to obtain estimated musical performance information, which is associated with the performance of the musical piece;

obtaining, via an obtaining circuit, manipulation information indicating manipulation input by a user and that is associated with a playback of the images; and controlling, via an image control circuit, the images to be output to a display device in tune with the performance of the musical piece based on:

the estimated musical performance information; and
the obtained manipulation information.

* * * * *